(12) United States Patent
Rivers et al.

(10) Patent No.: US 7,837,746 B2
(45) Date of Patent: Nov. 23, 2010

(54) GAS HYDRATE INHIBITORS

(75) Inventors: Gordon T. Rivers, Houston, TX (US); Daniel L. Crosby, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 1083 days.

(21) Appl. No.: 11/544,475

(22) Filed: Oct. 6, 2006

(65) Prior Publication Data

US 2007/0032689 A1    Feb. 8, 2007

Related U.S. Application Data

(62) Division of application No. 10/652,609, filed on Aug. 29, 2003, now Pat. No. 7,164,051.

(60) Provisional application No. 60/407,725, filed on Sep. 3, 2002.

(51) Int. Cl.
*C10L 1/32* (2006.01)

(52) U.S. Cl. .............. 44/301; 585/14; 585/15

(58) Field of Classification Search ............ 44/301; 585/14, 15
See application file for complete search history.

(56) References Cited

U.S. PATENT DOCUMENTS

| | | | |
|---|---|---|---|
| 5,420,370 A | 5/1995 | Sloan, Jr. | |
| 5,432,292 A | 7/1995 | Sloan, Jr. | |
| 5,491,269 A | 2/1996 | Colle et al. | |
| 5,583,273 A | 12/1996 | Colle et al. | |
| 5,600,044 A | 2/1997 | Colle et al. | |
| 5,639,925 A | 6/1997 | Sloan, Jr. et al. | |
| 5,648,575 A | 7/1997 | Klomp et al. | |
| 5,690,174 A | 11/1997 | Chapman et al. | |
| 5,723,524 A | 3/1998 | Cohen et al. | |
| 5,741,758 A | 4/1998 | Pakulski | |
| 5,744,665 A | 4/1998 | Costello et al. | |
| H1749 H | 9/1998 | Colle et al. | |
| 5,841,010 A | 11/1998 | Rabeony et al. | |
| 5,874,660 A | 2/1999 | Colle et al. | |
| 5,879,561 A | 3/1999 | Klomp et al. | |
| 5,880,319 A | 3/1999 | Sloan, Jr. | |
| 5,900,516 A | 5/1999 | Talley et al. | |
| 5,936,040 A | 8/1999 | Costello et al. | |
| 5,964,093 A | 10/1999 | Heinemann et al. | |
| 6,015,929 A | 1/2000 | Rabeony et al. | |
| 6,025,302 A | 2/2000 | Pakulski | |
| 6,028,233 A | 2/2000 | Colle et al. | |
| 6,028,234 A | 2/2000 | Heinemann et al. | |
| 6,028,236 A | 2/2000 | Toulhoat et al. | |
| 6,035,933 A | 3/2000 | Khalil et al. | |
| 6,063,972 A | 5/2000 | Duncum et al. | |
| 6,080,704 A | 6/2000 | Halliday et al. | |
| 6,093,863 A | 7/2000 | Cohen et al. | |
| 6,096,815 A | 8/2000 | Cohen et al. | |
| 6,102,986 A | 8/2000 | Klug | |
| 6,107,531 A | 8/2000 | Colle et al. | |
| 6,117,929 A | 9/2000 | Bakeev et al. | |
| 6,152,993 A | 11/2000 | Klomp | |
| 6,165,945 A | 12/2000 | Halliday et al. | |
| 6,177,497 B1 | 1/2001 | Klug et al. | |
| 6,180,699 B1 | 1/2001 | Bakeev et al. | |
| 6,180,843 B1 | 1/2001 | Heinemann et al. | |
| 6,194,622 B1 | 2/2001 | Peiffer et al. | |
| 6,222,083 B1 | 4/2001 | Colle | |
| 6,225,429 B1 | 5/2001 | Chuang et al. | |
| 6,242,518 B1 | 6/2001 | Bakeev et al. | |
| 6,251,836 B1 | 6/2001 | Duncum et al. | |
| 6,281,274 B1 | 8/2001 | Bakeev et al. | |
| 6,307,191 B1 | 10/2001 | Waycuilis | |
| 6,319,971 B1 | 11/2001 | Kelland et al. | |
| 6,331,508 B1 | 12/2001 | Pakulski | |
| 6,359,047 B1 | 3/2002 | Thieu et al. | |
| 6,369,004 B1 | 4/2002 | Klug et al. | |
| 6,436,877 B1 | 8/2002 | Duncum et al. | |
| 6,913,630 B2 * | 7/2005 | Filippini et al. | ............... 44/301 |

FOREIGN PATENT DOCUMENTS

WO    WO 96/41784 A1    12/1996

OTHER PUBLICATIONS

PCT International Search Report for PCT International Application No. PCT/US03/27689, Feb. 4, 2004.

* cited by examiner

*Primary Examiner*—Cephia D Toomer
(74) *Attorney, Agent, or Firm*—Mossman Kumar & Tyler PC

(57) ABSTRACT

A method for inhibiting formation of hydrocarbon hydrates in mixtures of water and a hydrate-forming guest molecule involves adding a reaction product to the mixtures in an effective amount to inhibit formation of the hydrocarbon hydrates under conditions otherwise effective to form the hydrocarbon hydrates in the absence of the reaction product. The product is made by the reaction of first reactant that is an amine or polyamine, or alcohol or polyalcohol, with a second, aldehyde reactant and a third reactant that is an alcohol or polyalcohol or, an amide or polyamide. Preferably, if the first and third reactants are both an alcohol or both a polyalcohol, they are not the same. A non-limiting example of a suitable amine would be a fatty alkyl amine, while formaldehyde would be a non-limiting of a suitable aldehyde and polyacrylamide would be a suitable third reactant.

18 Claims, No Drawings

GAS HYDRATE INHIBITORS

CROSS-REFERENCE TO RELATED APPLICATION

This application is a divisional from U.S. patent application Ser. No. 10/652,609 filed Aug. 29, 2003, issued Jan. 16, 2007 as U.S. Pat. No. 7,164,051, which in turn claims the benefit of U.S. provisional application Ser. No. 60/407,725 filed Sep. 3, 2002.

FIELD OF THE INVENTION

The invention relates to methods and compositions for inhibiting the formation of hydrocarbon hydrates, and most particularly relates, in one non-limiting embodiment, to methods and compositions for inhibiting the formation of hydrocarbon hydrates during the production of oil and gas.

BACKGROUND OF THE INVENTION

A number of hydrocarbons, especially lower-boiling light hydrocarbons, in formation fluids or natural gas are known to form hydrates in conjunction with the water present in the system under a variety of conditions—particularly at a combination of lower temperature and higher pressure. The hydrates usually exist in solid forms that are essentially insoluble in the fluid itself. As a result, any solids in a formation or natural gas fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons into the environment either on-land or off-shore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly $C_1$ (methane) to $C_4$ hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions.

There are two broad techniques to overcome or control the hydrocarbon hydrate problems, namely thermodynamic and kinetic. For the thermodynamic approach, there are a number of reported or attempted methods, including water removal, increasing temperature, decreasing pressure, addition of "antifreeze" to the fluid and/or a combination of these. The kinetic approach generally attempts (a) to prevent the smaller hydrocarbon hydrate crystals from agglomerating into larger ones (known in the industry as an anti-agglomerate AA) and/or; (b) to inhibit and/or retard initial hydrocarbon hydrate crystal nucleation; and/or crystal growth (known in the industry as a kinetic hydrate inhibitor and abbreviated KHI). Thermodynamic and kinetic hydrate control methods may be used in conjunction. Kinetic hydrate inhibitors are abbreviated KHI.

Kinetic efforts to control hydrates have included use of different materials as inhibitors. For instance, onium compounds with at least four carbon substituents are used to inhibit the plugging of conduits by gas hydrates. Additives such as polymers with lactam rings have also been employed to control clathrate hydrates in fluid systems. These kinetic inhibitors are commonly labeled Low Dosage Hydrate Inhibitors (LDHI) in the art.

Thus, it is desirable if new gas hydrate inhibitors were discovered which would yield comparable or improved results over known gas hydrate inhibitors.

SUMMARY OF THE INVENTION

An object of the invention is to provide a method for inhibiting gas hydrate formation in mixtures of hydrate-forming guest molecules and water where hydrates would otherwise form to a greater extent in absence of the method.

Another object of the invention is to provide gas hydrate inhibitor compositions and/or hydrate inhibitor synergists that are readily produced. These compositions may be blended with other oil field chemistries such as, but not limited to, corrosion, paraffin, scale and/or asphaltene inhibitors.

In carrying out these and other objects of the invention, there is provided, in one form, a method for inhibiting formation of hydrocarbon hydrates in a mixture having water and hydrate-forming guest molecules. The mixture is contacted with a composition under conditions effective to form the hydrocarbon hydrates in the absence of the composition. The composition includes a reaction product of a first reactant from the group of amines, polyamines, alcohols and polyalcohols with a second, aldehyde reactant and, a third reactant from the group of alcohols, polyalcohols, amides and polyamides, where the first and third reactants are different. The composition is present in an amount effective to inhibit formation of the hydrocarbon hydrates under the conditions.

In another non-limiting embodiment of the invention, in the method described immediately above, the amine to make the reaction product may be a primary or secondary cyclic amine; a primary or secondary acyclic amine; a fatty alkyl amine; a polyalkyleneimine; a polyallylamine; polyamines derived from condensation of ethylenedichloride, epichlorohydrin, or diepoxide with ammonia, ethylenediamine, polyethylenediamine, hexamethylenediamine, bis(hexamethylene)triamine, and mixtures thereof, as well as combinations of these amines and polyamines. The alcohol or polyalcohol to make the reaction product may be alcohols and diols containing 1 to 20 carbon atoms, starch, sugars, alkoxylated polyamines (e.g. ethoxylated and/or propoxylated polyamines including polyamines that have been both ethoxylated and propoxylated) and or polymers or copolymers of vinyl alcohol and/or allyl alcohol. When the polyalcohol is an alkoxylated polyamine within the definition of this invention, the polyamine may be fully or partially alkoxylated. The aldehyde to make the reaction product may be selected from the group consisting of aldehydes and dialdehydes having from 1 to 8 carbon atoms and compounds capable of generating these aldehydes under conditions effective to form the reaction product. The amide or polyamide to make the reaction product can be selected from the group consisting of cyclic amide, acyclic amide, polyacrylamide, and mixtures thereof.

In another aspect, the invention includes compositions formed by the method described above.

DETAILED DESCRIPTION OF THE INVENTION

In the present invention there are included methods and compositions used therein for inhibiting, retarding, mitigating, reducing, controlling and/or delaying formation of hydrocarbon hydrates or agglomerates of hydrates. The method may be applied to prevent or reduce or mitigate plugging of conduits, pipes, transfer lines, valves, and other places or equipment where hydrocarbon hydrate solids may form under conditions conducive to their formation or agglomeration.

The term "inhibiting" is used herein in a broad and general sense to mean any improvement in preventing, controlling, delaying, reducing or mitigating the formation, growth and/or agglomeration of hydrocarbon hydrates, particularly light hydrocarbon gas hydrates in any manner, including, but not limited to kinetically, thermodynamically, by dissolution, by breaking up, other mechanisms, or any combination thereof. Although the term "inhibiting" is not intended to be restricted to the complete cessation of gas hydrate formation, it may include the possibility that formation of any gas hydrate is entirely prevented.

The terms "formation" or "forming" relating to hydrates are used herein in a broad and general manner to include, but are not limited to, any formation of hydrate solids from water and hydrocarbon(s) or hydrocarbon and non-hydrocarbon gas(es), growth of hydrate solids, agglomeration of hydrates, accumulation of hydrates on surfaces, any deterioration of hydrate solids plugging or other problems in a system and combinations thereof.

The present method is useful for inhibiting hydrate formation for many hydrocarbons and hydrocarbon and/or non-hydrocarbon mixtures. The method is particularly useful for lighter or low-boiling, $C_1$-$C_5$, hydrocarbon gases, non-hydrocarbon gases or gas mixtures at ambient conditions. Examples of such gases include, but are not necessarily limited to, methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, xenon, and mixtures thereof. These molecules are also termed hydrate-forming guest molecules herein. Other examples include various natural gas mixtures that are present in many gas and/or oil formations and natural gas liquids (NGL). The hydrates of all of these low-boiling hydrocarbons are also referred to as gas hydrates. The hydrocarbons may also comprise other compounds including, but not limited to CO, $CO_2$, COS, hydrogen, hydrogen sulfide ($H_2S$), and other compounds commonly found in gas/oil formations or processing plants, either naturally occurring or used in recovering/processing hydrocarbons from the formation or both, and mixtures thereof.

The method of the present invention involves contacting a suitable composition with a mixture comprising the hydrocarbon and water. The composition comprises reaction products of an amine or a polyamine, or an alcohol or a polyalcohol, with an aldehyde together with an alcohol or a polyalcohol, or an amide or a polyamide. When an effective amount is used, hydrocarbon hydrate formation is inhibited under conditions where such hydrate formation is not otherwise inhibited in the absence of such effective amount. After the contacting and after the conditions no longer favor formation of gas hydrates, the method may further comprise, optionally, removing the composition, individual or certain components of the composition or other compounds or mixtures in the composition or the mixture comprising water and the hydrocarbons. In one non-limiting embodiment of the invention, the composition involves using a single reaction product to inhibit gas hydrates. By a "single reaction product" is meant the reaction product of one of an amine or polyamine, or an alcohol or a polyalcohol with one aldehyde together with one alcohol or polyalcohol, or amide or polyamide. The "single reaction product" may give a polymer product, since polyalcohols, polyamines and/or polyamides may be used, and thus a distribution of highly similar polymer products may result in the "single reaction product". It will also be understood that since three reactants are involved, a plurality of non-identical products or a distribution of products may results, which would still be considered "a single reaction product" in the context of this invention.

The contacting may be achieved by a number of ways or techniques, including, but not necessarily limited to, mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition in the mixture. The contacting can be made in-line or offline or both. The various components of the composition may be mixed prior to or during contact, or both. As discussed, if needed or desired, the composition or some of its components may be optionally removed or separated mechanically, chemically, or by other methods known to one skilled in the art, or by a combination of these methods after the hydrate formation conditions are no longer present.

Because the present invention is particularly suitable for lower boiling hydrocarbons or hydrocarbon and/or non-hydrocarbon gases at ambient conditions with no more than five carbon atoms, the pressure of the condition is usually at or greater than atmospheric pressure (i.e. greater than or equal to about 101 kPa), preferably greater than about 1 MPa, and more preferably greater than about 5 MPa. The pressure in certain formations or processing plants or units could be much higher, say greater than about 20 MPa. There is no specific high pressure limit. The present method can be used at any pressure that allows formation of hydrocarbon gas hydrates.

The temperature of the condition for contacting is usually below, the same as, or not much higher than the ambient or room temperature. Lower temperatures tend to favor hydrate formation, thus requiring the treatment with the compositions of the present invention. At much higher temperatures, however, hydrocarbon hydrates may not form, thus obviating the need of carrying out any treatments.

Suitable compounds for use in the composition for the present invention are defined as those formed as the reaction product of a first reactant that is an amine and/or a polyamine and/or an alcohol and/or a polyalcohol with a second, aldehyde reactant and a third reactant that is an alcohol and/or a polyalcohol and/or an amide and/or a polyamide.

In one non-limiting embodiment of the invention, suitable amines (first reactant) to make the reaction product include, but are not necessarily limited to, primary or secondary cyclic amines, primary or secondary acyclic amines, fatty alkyl amines, polyalkyleneimines, polyallylamines, polyamines derived from condensation of ethylenedichloride, epichlorohydrin, or diepoxide with ammonia, ethylenediamine, polyethylenediamine, hexamethylenediamine, bis(hexamethylene)triamine, and mixtures thereof. More specifically, acceptable non-polymeric amines may include, but are not necessarily limited to, N-methylbutylamine, and cyclic or acyclic amines containing from 2 to 14 carbon atoms. The amine may be primary or secondary. The amines and polyamines as defined herein may also be substituted with oxygen atoms, such as in the case of morpholine, or may be substituted with tertiary nitrogen atoms, such as in the case of imidazole or bis(dimethylamino)dipropylamine. Other particular, suitable amines include fatty alkyl amines, fatty alkyl diamines (e.g. N-tallowalkyl-1,3-diaminopropane such as Duomeen T available from Akzo Nobel), and higher derivatives such as fatty alkyl triamines. Additional equivalents within the definition of the first reactant herein may also include, but are not necessarily limited to, polyether amines sold under the trade name Jeffamine by Huntsman Chemical or ether amines sold by Tomah Products. Acceptable functional equivalents of the polyamine may include, but are not necessarily limited to, polypropyleneimine, polyallylamine, and polyamines derived from the condensation of ethylene dichloride, epichlorohydrin or diepoxides with ammonia, ethylenediamine, higher ethyleneamines, hexamethylenediamine, bis(hexamethylene)triamine, and mixtures thereof. In one particular, non-limiting embodiment of the invention, the preferred polyamine is polyethyleneimine.

With respect to the alcohols (possible first reactants or third reactants), the alcohols suitable for the reaction include alcohols and dialcohols with 1 to 20 carbon atoms. Polyalcohols suitable for the reaction include starch, sugars, and/or polymers or copolymers of vinyl alcohol or allyl alcohol. In one non-limiting embodiment of the invention, the same alcohol or polyalcohol does not serve simultaneously as both a first reactant and a third reactant. As defined herein, suitable polyalcohols also include alkoxylated polyamines, where the alkylene oxide reacted with the polyamine may be ethylene oxide, propylene oxide, butylenes oxide used alone or together. The definition also includes completely or partially alkoxylated polyamines.

With respect to the aldehydes (second reactant), the aldehydes suitable for the reaction product include, but are not necessarily limited to, aldehydes and dialdehydes having from 1 to 8 carbon atoms and compounds capable of generating these aldehydes under conditions effective to form the reaction product. In a particularly preferred, but non-limiting embodiment of the invention, the aldehyde is formaldehyde and compounds capable of generating formaldehyde, such as paraformaldehyde, trioxane or dimethoxmethane. These compounds capable of generating formaldehyde are defined herein as included in the definition of the second, aldehyde reactant.

With respect to the amides or polyamides (third reactant) used to form the reaction product, such amide or polyamide may include, but is not necessarily limited to, cyclic amides such as caprolactam, acyclic amides, polyacrylamide, and mixtures thereof. Functional equivalents of caprolactam may include, but are not necessarily limited to, cyclic secondary lactams or acyclic primary and/or secondary amides and mixtures thereof. The suitable lactams may contain from 3 to 10 carbon atoms and preferably 4 to 6 carbon atoms, in non-limiting embodiments. Suitable acyclic amides may contain 1 to 12 carbon atoms and preferably from 3 to 8 carbon atoms. Functional equivalents of suitable polyacrylamides that are within the definition of the third reactant include, but are not necessarily limited to, polymethacrylamide, polymaleimide, copolymers of maleimide, condensation polymers of amino acids (or the corresponding cyclic lactam or cyclic dimer), condensation polymers derived from dicarboxylic acids and diamines, and mixtures thereof. In one non-limiting embodiment of the invention, it is preferred that the amide be caprolactam, and in another non-limiting embodiment of the invention, it is preferred that the polyamide be aqueous polyacrylamide.

In a first non-limiting embodiment of the invention, the gas hydrate inhibitors of this invention are made by the reaction of a polyamine (such as polyethyleneimine) with an aldehyde (such as formaldehyde) and an amide that may be cyclic or amide, where these three reactants are defined as above. In a second non-limiting embodiment of the invention, the gas hydrate inhibitors of this invention are made by the reaction of a polyamide (such as polyarylamide) with an aldehyde (such as formaldehyde) and an amine, where these three reactants are defined as above. In a third non-limiting embodiment of the invention, the inventive gas hydrate inhibitors are made by the reaction of an amine containing a hydrophobic group, such as a fatty alkyl amine (or fatty alkyl diamine or fatty alkyl triamine) with an aldehyde (such as formaldehyde) and an amide that may be cyclic or amide, where these three reactants are defined as above. The resulting product has both hydrophilic and hydrophobic regions. In one non-limiting embodiment of the invention, it is preferred not to react polyamines with polyamides and aldehydes as the expected reaction products from this reaction may be too complex or a too high molecular weight material to be of use, or the products may be solids that cannot be readily dissolved in the solvents described herein, and because of the complexity of formulating practical high viscosity fluids for injection through small diameter conduits such as an umbilical.

The reaction products of this invention may be formed by reacting the amine or polyamine, or alcohol or polyalcohol with the aldehyde and the alcohol or polyalcohol, or the amide or polyamide in molar ratios of from about 1:0.01:0.01 to about 1:100:100; preferably from about 1:0.1:0.1 to about 1:1:1 (first reactant:second reactant:third reactant). The reaction conditions for producing the reaction products of this invention are relatively mild, ranging from about 15 to about 150° C., preferably from about 65 to about 120° C. The reaction pressures to make these products range from about 10 to about 1000 kPa, preferably from about 50 to about 500 kPa.

It will be appreciated that it is very difficult, if not impossible, to predict in advance the proportions effective in inhibiting hydrocarbon hydrate formations in any given situation. There are a number of complex, interrelated factors that must be taken into account in determining the effective dosage or proportion, including, but not necessarily limited to, the proportion of water in the hydrocarbon, the nature of the hydrocarbon, the temperature and pressure conditions that the mixture of hydrocarbon and water are subject to, the particular hydrocarbon hydrate inhibitor employed, etc. Nevertheless, in the interest of attempting to provide some general guidance of effective proportions, relative to the water phase, the amount of the reaction product is less than 5 wt %, alternatively less than 2 wt %, and in another non-limiting embodiment is less than 1 wt %, but is limited only by what is economically feasible. In one non-limiting embodiment the lower limit is about 0.005 wt %, and alternatively is about 0.02 wt % and possibly is about 0.01 wt %. In a first non-limiting embodiment of the invention, the amount of reaction product may range from less than 5 wt % to 0.005 wt %, and in an alternate non-limiting embodiment may range from less than 2 wt % to about 0.02 wt %.

In addition to the reaction product of the invention, the hydrocarbon inhibitor composition may further comprise other additional components, including, but not limited to, different controlling chemistries such as corrosion inhibitors, wax inhibitors, asphaltene inhibitors and other hydrate inhibitors and/or solvents. Suitable solvents include, but are not limited to water; at least one oxygenated compound selected from $C_1$-C6 alcohols, $C_2$-$C_6$ glycols, $C_1$-$C_6$ mono-aliphatic, preferably mono-alkyl, ethers of $C_2$-$C_6$ glycol, glycerin, $C_1$-$C_6$ mono-aliphatic, particularly mono-alkyl, ethers of glycerin, $C_1$-$C_6$ di-aliphatic, particularly dialkyl, ethers of glycerin, glycerin esters of $C_1$-$C_6$ carboxylate; tetrahydrofuran; N-methylpyrrolidone; sulfolane; $C_3$-$C_{10}$ ketones, and mixtures thereof. Examples of preferred solvents include water and liquid oxygenated materials such as methanol, ethanol, propanol, glycols like ethylene glycol, 1,2-propylene glycol, 1,3-propylene glycol, glycerin, esters and ethers of glycerin, CELLOSOLVE® (2-ethoxyethanol), CELLOSOLVE derivatives, 2-methoxyethanol, ethoxylated propylene glycols, ketones such as cyclohexanone and diisobutylketone, and mixtures thereof. The solvent is present in the total hydrocarbon hydrate inhibiting composition in the range of from 0 wt % to about 85 wt %, preferably from about 0 wt % to about 65 wt %, of the total composition, based on volume. CELLOSOLVE is a registered trademark of Union Carbide Corporation.

Because some of the reaction products disclosed herein will be solids under ambient conditions, it is often preferred to use a suitable solvent as described above in the composition. This allows the formation of a homogeneous or uniform solution, suspension, emulsion or a combination of these, of all the components for easier mixing or distributing or dispersing the composition in the hydrocarbon/water fluid or system to be treated. As a result, more efficient and/or favorable contacting of the composition with the mixture comprising water and the hydrate-forming guest molecules can be effected.

The present invention also may be used in combination with other methods or processes, which have been known to one skilled in the art as discussed in the background to help inhibit formation of hydrates.

The following examples only illustrate certain specific embodiments of the invention. They are not meant to limit the spirit or scope of the present invention in any manner. When the example and the associated results are read together with the rest of the written description of specification and the claims, one skilled in the art will more appreciate and better understand the instant invention and its other embodiments.

EXPERIMENTAL SET-UP

All testing is isochoric. This results in the cell pressure dropping as the cell temperature is ramped from 72° F. to 40° F. (22° C. to 4° C.). The starting pressure is about 1500 psig (10.3 MPa), the final cell pressure at 40° F. (4° C.), before hydrate formation, varies, and is dependent on the test fluids (composition, liquid hydrocarbon ratio, etc.) employed. Generally, the cell pressure drops to the 1200 to 1300 psig range (8.3 to 9.0 MPa) before hydrate formation.

Testing is performed with a bank of modified sight flow indicators, which serve as pressure vessel reactors. Each reactor or cell is isolated from its companions, and is independently pressurized and contains its own, independent pressure transducer. Up to six reactors constitute a bank of test cells. A test is performed by immersing a bank of test cells in a common temperature controlled water bath.

Depending upon the experimental protocol, the water bath (and therefore the cells within) is gently rocked and/or held stationary at time intervals. Stationary intervals are designed to mimic pipeline shut-ins.

Other important procedural features include:
1. The bath water temperature and each pressure transducer are independently monitored and the data preserved by a computerized data acquisition system.
2. Each cell contains stainless steel ball(s) that provide agitation of the cell's contents when the water bath is rocked.
3. At least one cell in every test bank is a control, containing either a reference inhibitor or none at all.
4. Tests employ either the shock cool method wherein the cells are placed in pre-chilled water or are ramp cooled from near room temperature to some target low temperature.
5. All cells are dissembled and meticulously cleaned with a proprietary system of solvents between each test.
6. Multiple repeats of a particular inhibitor blend are often made to provide a statistical sampling of a blend's performance.
7. Each cell has a window for visual observations.
8. Visual observations are made at irregular intervals to better ascertain the processes occurring within the cell and to confirm the results of the pressure data.

For the purpose of kinetic hydrate testing, the life and failure of a test blend is measured as the time expended before radical hydrate formation (retention time or time to failure). This point is denoted by a drop in pressure that is independent of a pressure drop due to a change in temperature.

The results of multiple experiments validating this invention are presented in the following Tables.

EXAMPLE 1

To a solution of 2.54 g. of polyethyleneimine (approximate molecular weight 600) in 56 g. of methanol was dissolved 6.67 g. of caprolactam. To this solution was added 4.79 g. of 37% aqueous formaldehyde. The solution was sealed in a four ounce (118 cm$^3$) bottle and kept at 65° C. for 20 hours to give a clear, light amber solution of gas hydrate inhibitor/synergist. The results of testing the formulation of Example 1 are presented in Tables I and II below. The induction time is the time until hydrate formation.

TABLE I

| Test Fluids | Induction Time (hr) |
|---|---|
| Blank (2.5 wt % brine with 10 wt % MeOH - no liquid hydrocarbon phase) plus 1500 psig 95/5 mole % methane/propane, isochoric, ramp cooling from 72° F. to 40° F. (22° C. to 4° C.) | 10.8 |
| Example 1 formulation @ 0.5 wt % in a 2.5 wt % brine with 10 wt % MeOH - no liquid hydrocarbon phase - plus 1500 psig 95/5 mole % methane/propane, isochoric, ramp cooling from 72° F. to 40° F. (22° C. to 4° C.) | 11.8 |

TABLE II

| Test Fluids | Induction Time (hr) |
|---|---|
| Blank (2.5 wt % brine with 10 wt % MeOH - 20 vol % black oil) plus 1500 psig synthetic natural gas blend*, isochoric, ramp cooling from 72° F. to 40° F. (22° C. to 4° C.) | 11.7 |
| Example 1 formulation @ 1.0 wt % in a 2.5 wt % brine with 10 wt % MeOH - 20 vol % black oil - plus 1500 psig synthetic natural gas blend, isochoric, ramp cooling from 72° F. to 40° F. (22° C. to 4° C.) | 13.0 |
| LDHI #1 @ 0.5 wt % + Example 1 formulation @ 0.5 wt % in a 2.5 wt % brine with 10 wt % MeOH - 20 vol % black oil - plus 1500 psig synthetic natural gas blend, isochoric, ramp cooling from 72° F. to 40° F. (22° C. to 4° C.) | 16.0 |

*The synthetic natural gas blend is 1/5/5.4/88.6 mole % $CO_2/C_2/C_3/C_1$.

EXAMPLE 2

To a solution of 9.16 g. of 50% aqueous polyacrylamide (approximate molecular weight 10,000) in 56 g. of propylene glycol was added 3.93 g. of N-methyl-butylamine. To this dispersion was added 3.66 g. of 37% aqueous formaldehyde. The dispersion was mixed at ambient temperature until it became homogeneous. The solution was sealed in a four ounce (118 cm$^3$) bottle and kept at 65° C. for 20 hours to give a clear, light amber solution of gas hydrate inhibitor/synergist.

EXAMPLE 3

To a solution of 5.12 g. of Duomeen T (N-tallowalkyl-1,3-diaminopropane from Akzo Nobel) in 56 g. of isopropanol was dissolved 5.17 g. of caprolactam. To this solution was added 3.71 g. of 37% aqueous formaldehyde. The solution was sealed in a four ounce (118 cm$^3$) bottle and kept at 65° C. for 20 hours to give a clear, light amber solution of gas hydrate inhibitor/synergist.

EXAMPLE 4

To a solution of 8.09 g. of polyethyleneimine (approximate molecular weight 600) in 46.67 g. of methanol was added 15.25 g. of 37% aqueous formaldehyde. A mild exothermic reaction occurred with the addition of the formaldehyde. The sample of gas hydrate inhibitor/synergist was not heated further.

Many modifications may be made in the compositions and methods of this invention without departing from the spirit and scope thereof that are defined only in the appended claims. For example, the exact reactants and reaction products may be different from those used here. Various combinations of alcohol or polyalcohol, or amide or polyamide reactants with aldehydes and amines or polyamines other than those exemplified here are also expected to find use in providing improved hydrate inhibitors. Further, different reaction products from those discussed and exemplified are also expected to be useful herein.

We claim:

1. A mixture inhibited against hydrocarbon hydrate formation in the presence of water, the mixture comprising water; hydrate-forming guest molecules selected from the group consisting of methane, ethane, ethylene, acetylene, propane, propylene, methylacetylene, n-butane, isobutane, 1-butene, trans-2-butene, cis-2-butene, isobutene, butene mixtures, isopentane, pentenes, natural gas, carbon dioxide, hydrogen sulfide, nitrogen, oxygen, argon, krypton, xenon, and mixtures thereof; and a composition, where the composition comprises a reaction product of a first reactant selected from the group consisting of amines, polyamines, alcohols and polyalcohols with a second, aldehyde reactant, and a third reactant selected from the group consisting of alcohols, polyalcohols, amides and polyamides, where the first and third reactants are different; and the composition amount is effective in inhibiting formation of the hydrocarbon hydrates.

2. The mixture of claim 1 where the reaction product comprises both hydrophilic and hydrophobic regions.

3. The mixture of claim 1 where the amine of the reaction product is selected from the group consisting of a primary or secondary cyclic amine; a primary or secondary acyclic a1mine; a fatty alkyl amine; a polyalkyleneimine; a polyallylamine; polyamines derived from condensation of ethylenedichloride, epichlorohydrin, or diepoxide with ammonia, ethylenediamine, polyethylenediamine, hexamethylenediamine, bis(hexamethylene)triamine, and mixtures thereof; and combinations thereof.

4. The mixture of claim 1 where the alcohol or polyalcohol of the reaction product is selected from alcohols and diols containing 1 to 20 carbon atoms, starch, sugars, polymers or copolymers of vinyl alcohol and/or allyl alcohol, and alkoxylated polyamines.

5. The mixture of claim 1 where the aldehyde of the reaction product is selected from the group consisting of aldehydes and dialdehydes having from 1 to 8 carbon atoms and compounds capable of generating these aldehydes under conditions effective to form the reaction product.

6. The mixture of claim 1 where the amide or polyamide of the reaction product is selected from the group consisting of cyclic amides, acyclic amides, polyacrylamides, and mixtures thereof.

7. The mixture of claim 1 where the reaction product is prepared by the process of reacting from about 0.01 to about 100 moles of amine or polyamine, or alcohol or polyalcohol, with from about 0.01 to about 100 moles of aldehyde with from about 0.01 to about 100 moles of alcohol or polyalcohol, or amide or polyamide.

8. The mixture of claim 1 where the amount of reaction product ranges from less than 5 wt % to about 0.005 wt % based on the water.

9. A mixture inhibited against hydrocarbon hydrate formation in the presence of water, the mixture comprising water; hydrate-forming guest molecules selected from the group consisting of methane, ethane, ethylene, acetylene, propane, propylene, methylacetylene, 1-butene, trans-2-butene, cis-2-butene, isobutene, butene mixtures, pentenes, natural gas, carbon dioxide, hydrogen sulfide, nitrogen, oxygen, argon, krypton, xenon, and mixtures thereof; and a composition, where the composition comprises a reaction product of a first reactant selected from the group consisting of amines, polyamines, alcohols and polyalcohols with a second, aldehyde reactant, and a third reactant selected from the group consisting of alcohols, polyalcohols, amides and polyamides selected from the group consisting of cyclic amides, acyclic amides, polyacrylamides, and mixtures thereof, where the first and third reactants are different, where the reaction product comprises both hydrophilic and hydrophobic regions; and the composition amount is effective in inhibiting formation of the hydrocarbon hydrates in the composition.

10. The mixture of claim 9 where the amine of the reaction product is selected from the group consisting of a primary or secondary cyclic amine; a primary or secondary acyclic amine; a fatty alkyl amine; a polyalkyleneimine; a polyallylamine; polyamines derived from condensation of ethylenedichloride, epichlorohydrin, or diepoxide with ammonia, ethylenediamine, polyethylenediamine, hexamethylenediamine, bis(hexamethylene)triamine, and mixtures thereof; and combinations thereof.

11. The mixture of claim 9 where the alcohol or polyalcohol of the reaction product is selected from alcohols and diols containing 1 to 20 carbon atoms, starch, sugars, polymers or copolymers of vinyl alcohol and/or allyl alcohol, and alkoxylated polyamines.

12. The mixture of claim 9 where the aldehyde of the reaction product is selected from the group consisting of aldehydes and dialdehydes having from 1 to 8 carbon atoms and compounds capable of generating these aldehydes under conditions effective to form the reaction product.

13. The mixture of claim 9 where the amount of reaction product ranges from less than 5 wt % to about 0.005 wt % based on the water.

14. A mixture inhibited against hydrocarbon hydrate formation in the presence of water, the mixture comprising water;
   hydrate-forming guest molecules selected from the group consisting of methane, ethane, ethylene, acetylene, propane, propylene, methylacetylene, 1-butene, trans-2-butene, cis-2-butene, isobutene, butene mixtures, pentenes, natural gas, carbon dioxide, hydrogen sulfide, nitrogen, oxygen, argon, krypton, xenon, and mixtures thereof; and
   a composition, where
      the composition comprises a reaction product of a first reactant selected from the group consisting of amines, polyamines, alcohols and polyalcohols with a second, aldehyde reactant, and a third reactant selected from the group consisting of alcohols, polyalcohols, amides and polyamides, where the first and third reactants are different, where the reaction product comprises both hydrophilic and hydrophobic regions; and
      amount of reaction product ranges from less than 5 wt % to about 0.005 wt % based on the water,
where the reaction product is prepared by the process of reacting from about 0.01 to about 100 moles of amine or polyamine, or alcohol or polyalcohol, with from about 0.01 to about 100 moles of aldehyde with from about 0.01 to about 100 moles of alcohol or polyalcohol, or amide or polyamide.

15. The mixture of claim 14 where the amine of the reaction product is selected from the group consisting of a primary or secondary cyclic amine; a primary or secondary acyclic amine; a fatty alkyl amine; a polyalkyleneimine; a polyallylamine; polyamines derived from condensation of ethylenedichloride, epichlorohydrin, or diepoxide with ammonia, ethylenediamine, polyethylenediamine, hexamethylenediamine, bis(hexamethylene)triamine, and mixtures thereof; and combinations thereof.

16. The mixture of claim 14 where the alcohol or polyalcohol of the reaction product is selected from alcohols and diols containing 1 to 20 carbon atoms, starch, sugars, polymers or copolymers of vinyl alcohol and/or allyl alcohol, and alkoxylated polyamines.

17. The mixture of claim 14 where the aldehyde of the reaction product is selected from the group consisting of aldehydes and dialdehydes having from 1 to 8 carbon atoms and compounds capable of generating these aldehydes under conditions effective to form the reaction product.

18. The mixture of claim 14 where the amide or polyamide of the reaction product is selected from the group consisting of cyclic amides, acyclic amides, polyacrylamides, and mixtures thereof.

* * * * *

UNITED STATES PATENT AND TRADEMARK OFFICE
CERTIFICATE OF CORRECTION

| | |
|---|---|
| PATENT NO. | : 7,837,746 B2 |
| APPLICATION NO. | : 11/544475 |
| DATED | : November 23, 2010 |
| INVENTOR(S) | : Gordon T. Rivers and Daniel L. Crosby |

It is certified that error appears in the above-identified patent and that said Letters Patent is hereby corrected as shown below:

At column 6, line 67, please delete $C_1$-C6 alcohols and insert therefor -- $C_1$ - $C_6$ alcohols --.

In claim 3, at column 9, line 67, please delete "a1 mine" and insert therefor -- amine --.

In claim 9, at column 10, line 51, please delete "in the composition".

Signed and Sealed this
First Day of February, 2011

David J. Kappos
*Director of the United States Patent and Trademark Office*